(12) United States Patent
Pioger et al.

(10) Patent No.: US 8,233,509 B2
(45) Date of Patent: Jul. 31, 2012

(54) LASER SYSTEM WITH PICOSECOND PULSE EMISSION

(75) Inventors: Paul-Henri Pioger, Limoges (FR); Bertrand Vergne, Limoges (FR); Vincent Couderc, Verneuil-sur-Vienne (FR); Alain Barthelemy, Limoges (FR)

(73) Assignee: Centre National de la Recherche Scientifique—CNRS, Paris (FR)

( * ) Notice: Subject to any disclaimer, the term of this patent is extended or adjusted under 35 U.S.C. 154(b) by 399 days.

(21) Appl. No.: 12/515,839

(22) PCT Filed: Nov. 21, 2007

(86) PCT No.: PCT/FR2007/001916
§ 371 (c)(1),
(2), (4) Date: Nov. 20, 2009

(87) PCT Pub. No.: WO2008/074941
PCT Pub. Date: Jun. 26, 2008

(65) Prior Publication Data
US 2010/0158054 A1    Jun. 24, 2010

(30) Foreign Application Priority Data

Nov. 27, 2006 (FR) .................................. 06 10357

(51) Int. Cl.
*H01S 3/10* (2006.01)

(52) U.S. Cl. ............................................. 372/25; 372/27
(58) Field of Classification Search .................... 372/19, 372/25, 27, 30
See application file for complete search history.

(56) References Cited

U.S. PATENT DOCUMENTS 4,704,720 A * 11/1987 Yamaguchi ...................... 372/96
4,938,596 A * 7/1990 Gauthier et al. ................. 356/515

OTHER PUBLICATIONS

Ahmed et al, Generation of 185 fs Pedestal-Free Pulses Using 1.55 um Distributed Feedback Semiconductor Laser, Electronics Letters, Feb. 2, 1995, vol. 31, No. 3.*
Stolen et al, Intensity Discrimantion of Optical Pulses With Birefringent Fibers, Optics Letters, Oct. 1982, vol. 7, No. 10.*

* cited by examiner

*Primary Examiner* — Armando Rodriguez
(74) *Attorney, Agent, or Firm* — Arent Fox LLP

(57) ABSTRACT

The invention relates to a device (1) for generating short pulses, said device being characterized in that it comprises: a polarized pulse laser (10, 2, 3) having a polarization direction; a bi-refringent optical fiber (6) having bi-refringence axes, wherein said polarization direction is not co-linear with said bi-refringence axes; an output polarizer (9) provided at the output of said fiber, said polarizer being capable of selecting a polarization at the output of said fiber; wherein said pulse laser in a longitudinally quasi-single mode laser.

12 Claims, 2 Drawing Sheets

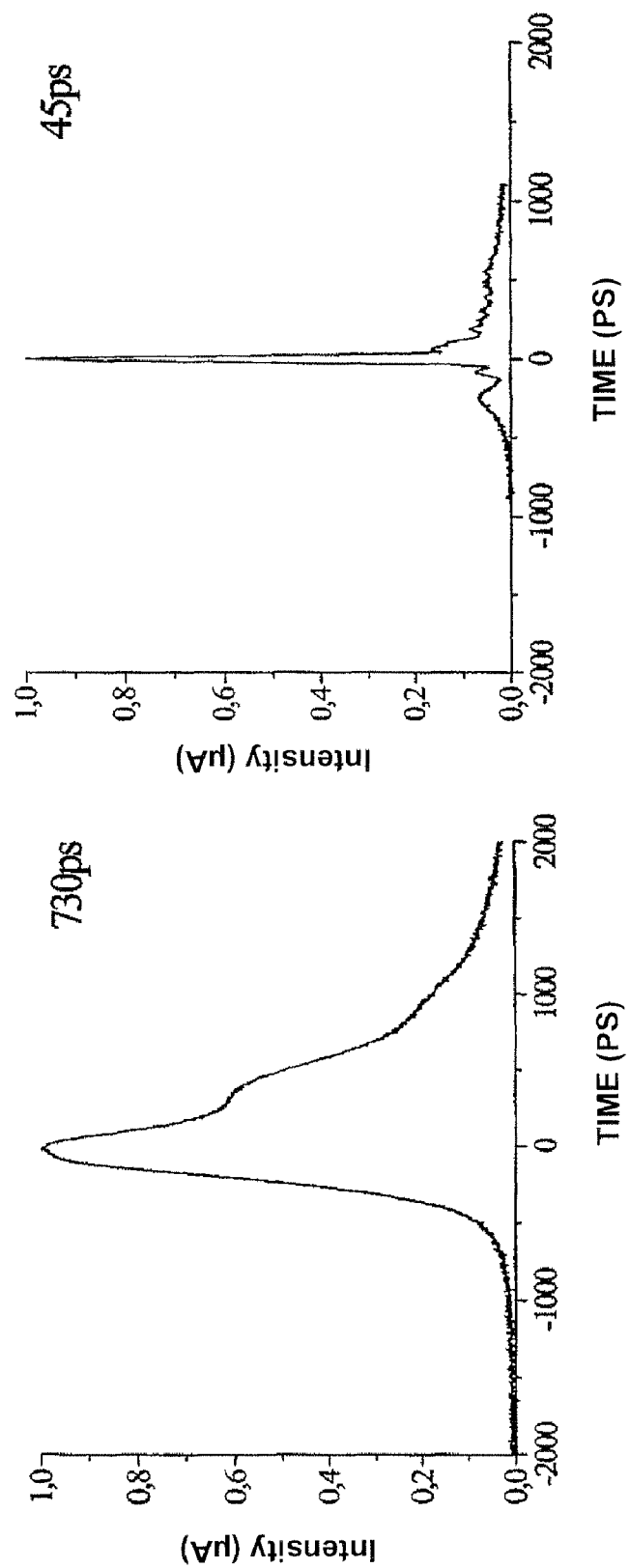

LASER SYSTEM WITH PICOSECOND PULSE EMISSION

CROSS-REFERENCE TO RELATED APPLICATION

This application is a National Stage entry of International Application No. PCT/FR2007/001916, filed Nov. 21, 2007, which claims priority to French Patent Application No. 06/10357, filed Nov. 27, 2006 the disclosure of the prior applications is hereby incorporated in their entirety by reference.

The invention relates to a device for generating short pulses.

There are known ways of using mode-locked lasers to generate short pulses, typically of the order of several tens or hundreds of picoseconds.

However, the average cost of such a mode-locked laser is very high. Furthermore, it requires considerable maintenance to ensure its performance, given its complexity. Finally, the energy of the pulse of a mode-locked laser is weak, due to it high rate of repetition.

The invention aims to solve these disadvantages of known devices for generating short pulses.

One aim of the invention is therefore initially to provide a less expensive and/or more compact alternative to the devices for generating short pulses comprising a mode-locked laser.

Another aim of the invention is to provide an alternative to mode-locked lasers making it possible to obtain good power levels.

According to the invention, this aim is achieved by providing a device comprising a pulse laser with a given pulse duration, and reducing this pulse duration to obtain a short pulse at its output.

The general principle behind reducing the duration of a pulse has already been described, for example, in the publication by Stolen et al. <<Intensity discrimination of optical pulses with birefringent fibers>>, Optics letters, October 1982.

This publication describes a device comprising:
  a polarised pulse laser having a polarisation direction;
  a bi-refringent optical fibre having bi-refringence axes, said polarisation direction not being co-linear with said bi-refringence axes;
  an output polariser positioned at the output of said fibre, said polariser being capable of selecting a polarisation at the output of said fibre.

This publication describes precisely why the fact that the polarisation direction of the laser is not co-linear with the bi-refringence axes of the fibre makes it possible, by rotating the polarisation around the two axes using the Kerr effect, to reduce the duration of the pulse at the output of the output polariser. This publication describes the fact that the pulse duration is reduced and that the low-power pins of the pulse are removed. The output polariser makes it possible to recover the part of the pulse in which the polarisation has rotated using the Kerr effect.

In this publication, the pulse laser is a mode-locking argon laser. The device of the aforementioned publication therefore makes it possible to generate short pulses, but using a pulse laser which already generates its own short pulses.

The use of a mode-locking laser therefore has the disadvantages described above.

Furthermore, the reduction of pulse duration described in the aforementioned publication is too slight to allow it to be used with a laser with a considerably long pulse duration at its input, which is to be reduced considerably.

On the other hand, it is known that continuous mode lasers, commonly known as "Q-switching" lasers, are relatively simple, inexpensive and sturdy.

However, it is known that Q-switching lasers can only provide pulses of the order of several hundred picoseconds. For this reason, Q-switching lasers are not used to provide short (several picoseconds) or ultra-short pulses (several tens of femtoseconds).

The invention aims to solve these disadvantages of the prior art.

The main aim of the invention is to provide a less expensive and/or more compact alternative to the devices for generating short pulses comprising a mode-locked laser.

The invention also aims to provide a device for generating shorter pulses than those that can be generated by a simple Q-switching laser.

At least one of these aims is achieved according to the invention which relates to a device for generating short pulses, said device being characterised in that it comprises:
  a polarised pulse laser having a polarisation direction;
  a bi-refringent optical fibre having bi-refringence axes, said polarisation direction not being co-linear with said bi-refringence axes;
  an output polariser positioned at the output of said fibre, said polariser being capable of selecting a polarisation at the output of said fibre;
in which said pulse laser is a longitudinally quasi-single mode laser.

According to the invention, it offers an alternative to mode-locked lasers, reducing the pulse duration of the Q-switching pulse laser.

As in the aforementioned publication, this is carried out in particular by passive cutting using the Kerr effect in a bi-refringent fibre.

Also according to the invention, the chosen pulse laser is a longitudinally quasi-single mode laser. In the context of the invention, as is generally the case for those skilled in the trade, longitudinally quasi-single mode laser refers to a laser comprising one or two longitudinal modes.

This laser is clearly different from the laser used, for example, in the aforementioned publication, which is a mode-locked laser typically comprising 100 to 200 longitudinal modes.

Thanks to this longitudinally quasi-single mode laser, the effect of reducing the pulse duration is greatly improved.

In fact, for a laser producing phase-locked longitudinal-mode pulses, the aforementioned Kerr effect acts especially on the part of the pulse with the highest intensity. In these conditions, only the low power levels synthesised by the pulse pins (generally Gaussian or $sech^2$) remain unchanged and can therefore be reduced. The temporal reduction due to the profile of the pulse therefore remains slight for the duration of the pulse, typically with a factor of 1.5 to 3.

On the other hand, according to the invention, for a quasi-single mode laser, the effect of reducing pulse duration is considerably improved, typically with a reduction factor that can be greater than 10, or even than 16.

Also known in the state of the art is the document entitled "Generation of 185 fs pedestral-free pulsing using a 1.55 distributed feedback semiconductor laser", by Ahmed et al., ELECTRONICS LETTERS, February 1995, which describes a device capable of generating short pulses, said device comprising:
  a polarised pulse laser having a polarisation direction;
  a bi-refringent optical fibre;
  an output polariser capable of selecting a polarisation at the output of the fibre.

In this document, the polarised pulse laser is a DFB laser (those skilled in the trade will know that this acronym stands for "Distributed Feedback Laser"). This DFB laser is a semiconductor gain-switching laser operating at 1.55 micrometers. According to this document, the pulses emitted by this laser are compressed and cleaned by soliton effect and non-linear rotation of the polarisation within the bi-refringent optical fibre.

And yet, the document does not mention the longitudinal modes of the DFB laser. However, those skilled in the trade know well that DFB lasers can comprise a large number of longitudinal modes, typically 100 to 200 longitudinal modes as mentioned previously. The aforementioned document does not therefore describe the use of a longitudinal quasi-single mode laser and does not therefore obtain the reduction of laser pulse duration by the Kerr effect as in the invention mentioned above.

In addition, the combination of a solitonic effect and a rotation of the polarisation induces specific effects which are different from those obtained using only a polarisation rotation. In particular, the solitonic regime imposes an abnormal scattering regime. In addition, the power of the soliton wave is fixed by the soliton effect.

Consequently, according to the invention, the effect of reducing the pulse duration is obtained from a combination of the longitudinal quasi-single mode laser and the effect of rotating the polarisation, and not, as in the aforementioned publication, from a combination of the solitonic effect and polarisation rotation. The device according to the invention, using a non-solitonic polarisation rotation, is therefore more straightforward, less expensive and more flexible in terms of adjustment than the device of the state of the art using solitonic rotation, all while enabling a good reduction of the pulse duration.

As regards the aforementioned publication, the invention therefore mainly solves the problem of obtaining a good reduction of the pulse duration, even under a non-solitonic regime.

Furthermore, for a pulse of 600 picoseconds, the solitonic regime of the state of the art has the effect of causing the pulse to explode into very short sub-pulses. It is therefore very difficult, according to the state of the art, to select a single pulse with reduced duration. On the other hand, according to the invention, by using a non-solitonic regime the device is capable of reducing the duration of all types of pulses.

Moreover, the fact of being, as in the invention, in a non-solitonic regime, makes it possible to obtain a normal scattering regime. It is therefore possible to use a 1-micrometer standard single-mode optical fibre combined with a microlaser emitting at 1 micrometer. The device thus obtained is then more straightforward and less expensive than the device of the state of the art using the abnormal scattering regime imposed by soliton propagation.

Finally, in the aforementioned publication, due to the solitonic regime, it is very difficult or even impossible to use nanosecond or sub-nanosecond pulses.

Further advantageous characteristics of the invention are described below.

In particular, the bi-refringent optical fibre can be arranged to generate a rotation of the polarisation direction in normal scattering regime, in particular in non-solitonic regime. According to the invention, it is then possible to obtain an effect of reducing the pulse duration, even in such a solitonic regime.

Moreover, the pulse laser can be a Q-switching laser with very small cavity length. This cavity length therefore imposes a frequential spacing df between the longitudinal modes which must be greater than the gain width M of the laser amplifying materials. In a known fashion, the value of the frequential spacing is $df=c/(2 \cdot l)$, where c is the speed of light and l is the length of the cavity. This makes it easy to ensure that the laser is longitudinally quasi-single mode. The pulse laser can be a Q-switching laser operating between 800 nanometers and 1.2 micrometers.

Furthermore, in order to obtain a pulse laser having a polarisation direction, it is possible either to use a non-polarised pulse laser associated with a polariser or a naturally polarised laser. The latter has the advantage of being able to benefit from all the power of the laser in the natural polarisation direction. On the other hand, the advantage of the polariser is that the polarisation direction can be easily chosen.

Furthermore, the aforementioned device can also include a half-wave plate positioned between the polarised pulse laser and the fibre, and arranged so that the polarisation direction of the laser wave at the output of said half-wave plate is not co-linear with said bi-refringence axes.

Alternatively, said polarised pulse laser is arranged in relation to said fibre so that said polarisation direction is not co-linear with said bi-refringence axes.

Alternatively, the aforementioned device can include so-called Lefebvre loops positioned at the fibre input and arranged so that the polarisation direction of the laser wave at the output of said loops is not co-linear with said bi-refringence axes of the fibre. These Lefebvre loops make it possible to control the orientation of the polarisation vector of the pulse laser polarised in relation to the axes of the fibre. These Lefebvre loops are known to those skilled in the trade as having the power to direct the polarisation vector of radiation propagating through a fibre.

Furthermore, in order to avoid modal scattering, said polarised pulse laser is capable of emitting a laser pulse with an emission wavelength, and said fibre is a single-mode fibre transversal to said emission wavelength.

Moreover, said fibre can be such that the scattering zero wavelength of said fibre is greater than said emission wavelength. This avoids physical effects, called soliton effects, which interfere with pulse reduction as previously described.

The invention also relates to a method for generating short pulses including steps in which:
  a device such as previously described is provided;
  the polarised pulse laser generates long pulses;
  the long pulses are cut up in the bi-refringent optical fibre in order to generate short pulses;
  the short pulses are recovered at the output of the output polariser.

In this method, the Applicant has shown that the pulse duration of the short pulses can be 10 to 16 times shorter than the pulse duration of the long pulses.

One embodiment is described below in relation to the appended drawings, in which:

FIG. 1 shows one embodiment of a device according to the invention;

FIGS. 2A and 2B respectively show the pulse generated by the pulse laser at the input of the device according to the invention and the pulse obtained at the output of the device according to the invention.

As shown in FIG. 1, a device 1 according to the invention comprises a pulse laser 2, an input polariser 3, an input half-wave plate 4, an input lens 5, a bi-refringent fibre 6, an output lens 7, an output half-wave plate 8 and an output polariser 9.

The pulse laser 2 is a laser that can emit pulses with a duration of the order of one nanosecond. In more general terms, the laser 2 can be a laser emitting pulses with a duration of more than 100 picoseconds. Below this limit, any reduction in the duration is difficult to implement.

The emission frequency is around 6 kHz. This frequency can also be variable in the context of the invention, typically up to 100 kHz.

The laser 2 emits in a range comprised between 800 nanometers and 1.2 micrometers, and preferably in the near-infrared with a wavelength of 1064 nanometers.

The laser 2 is longitudinally single-mode or bi-mode at most, for example a Q-switching laser. The laser 2 is also transversally single-mode or bi-mode, in this case with only one longitudinal mode per transverse mode. This is possible if the laser cavity is arranged so that the longitudinal mode pins induced by each transverse mode are separated by more than $c/(2 \cdot l)$, where c is the speed of light and l is the length of the cavity, so that a single longitudinal mode is in the gain zone of the laser amplifier material. The laser 2 can, for example, be a micro-laser.

The input polariser 3 is placed at the output of the laser to polarise the laser output beam. The assembly comprising the laser 2 and the polariser 3 forms a polarised laser 10 which will be described below.

If the laser 2 is directly polarised, this polariser can be removed from the embodiment of the invention. In this case, the polarised laser 10 consists only of the pulse laser 2.

The fibre 6 is a single-mode fibre transversal to the 1064-nanometer emission wavelength of the laser. This is a bi-refringent fibre therefore comprising bi-refringence axes, also called neutral axes.

The retardation plate 4 is placed between the polarised laser 10 and the fibre 6 to direct the polarisation axis of the polarised laser 10 in relation to the bi-refringence axes of the fibre 6.

According to the orientation of the polarised laser 10 in relation to the fibre 6, the retardation plate 4 directs the polarisation axis of the polarised laser 10 so that the polarisation direction is not parallel with the bi-refringence axes of the fibre 6. If the polarised laser 10 is directly oriented in relation to the fibre 6 so that the preceding condition is fulfilled, it is also possible to dispense with the retardation plate 4 in the context of the invention.

The lens 5 forms means for injecting the laser signal issued from the retardation plate 4 into the fibre 6.

The laser signal passes through the fibre 6 and is subject to the effects of the non-linearities of the fibre caused by the bi-refringence. These effects are, for example, phase self-modulation or phase cross-modulation effects corresponding to spectral broadening. In particular, as shown in the aforementioned publication, the Kerr effect induces a rotation of the polarisation vector of the laser signal. This effect is produced when the polarisation direction of the signal at the input of the fibre is not co-linear with the bi-refringence axes, so that the projections of the polarisation vector on the two axes are greater than zero.

The fibre 6 is such that the effect of rotation of the polarisation vector takes place in a normal scattering regime in a non-solitonic mode.

At the output, a collimation lens 7 provides a beam with low divergence.

The polariser 9 makes it possible, according to its orientation in relation to the fibre 6 or the half-wave plate 8, to select a longer or shorter pulse duration, extending between the duration of the input pulse and a pulse shorted by a maximum factor of nearly 16.

When the polariser 9 is arranged in relation to the fibre 6 so as to select the output signal, possibly by means of the half-wave plate 8, only the power that was mostly subjected to the Kerr effect is sampled.

It is then possible to position a temporal analyser, not shown, to determine the temporal profile of the signal thus obtained.

The Applicant has shown that the effect of reducing the pulse was very strong thanks to the fact that the input pulse laser is longitudinally quasi-single mode. This preferred use of the Kerr effect makes it possible, in particular, to obtain a reduction factor of the order of 10 to 16.

FIG. 2A shows a pulse emitted by the polarised pulse laser 10 in the form of intensity according to time, in picoseconds. The typical pulse duration is around 730 picoseconds.

FIG. 2B is the signal obtained at the output of the device 1 according to the invention in the form of an intensity according to time, in picoseconds. The typical pulse duration is around 45 picoseconds, which corresponds to a reduction factor of 16.

Figure 1:
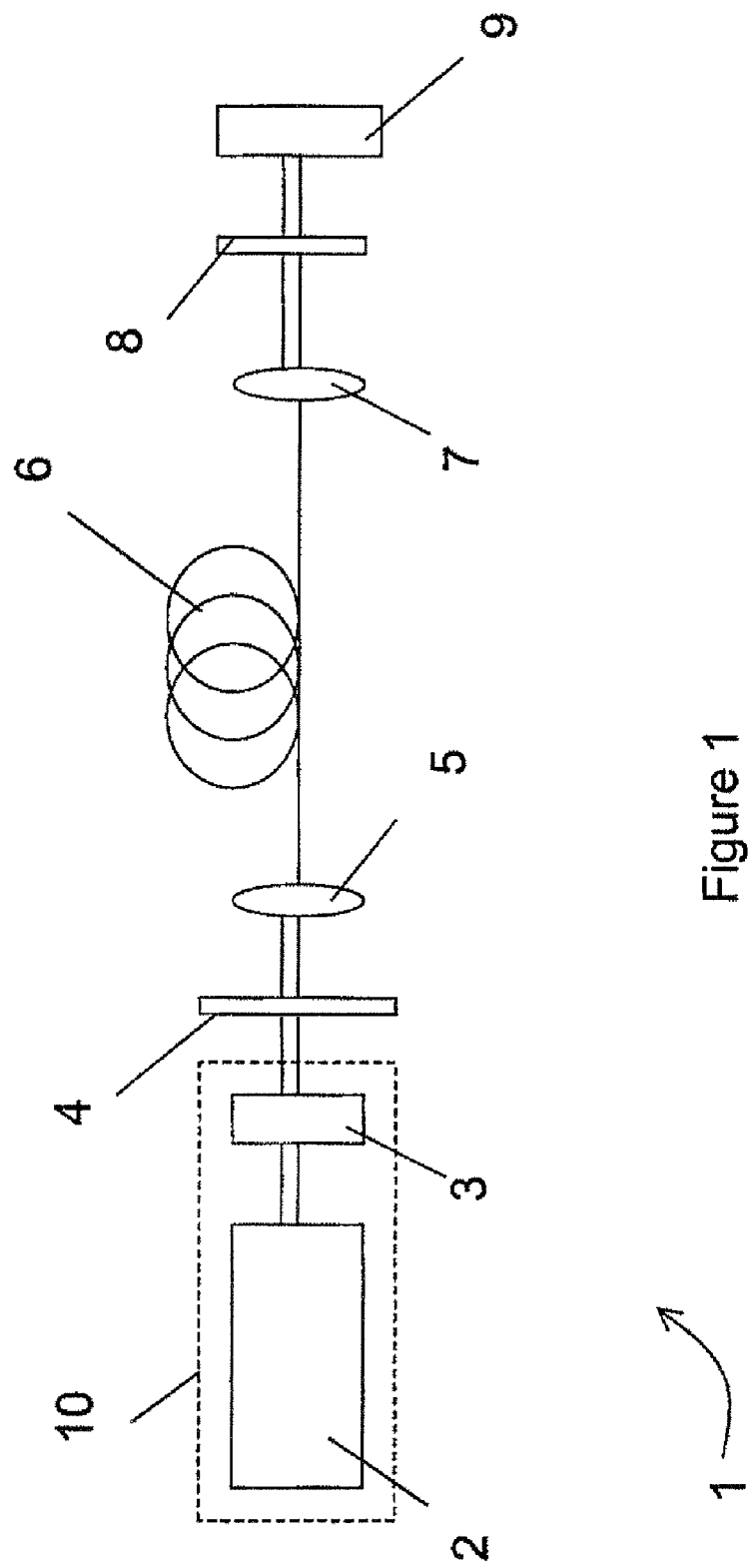

This reduction factor is a lot larger than the reduction factors that may have been reported in publications relating to the association of a birefringent fibre with a multi-mode laser.

In the context of the invention, the pulses obtained at the output of the device 1 are therefore short in relation to the pulses obtained at the output of the polarised pulse laser 10, which, in comparison, generates long pulses. The ratio between the short pulses and the long pulses can be from around one to more than ten.

The invention claimed is:

1. A device for generating short pulses, said device comprising:
    a pulse laser outputting light with an emission wavelength and with a polarisation direction;
    a bi-refringent optical fibre with bi-refringence axes, in which the bi-refringent optical fibre is arranged to generate a rotation of the polarisation direction in a non-solitonic regime, said polarisation direction not being co-linear with said bi-refringence axes;
    an output polariser positioned at the output of said fibre, said polariser being capable of selecting a polarisation at the output of said fibre;
    in which said pulse laser is a longitudinally quasi-single mode laser.

2. The device according to claim 1, in which the bi-refringent optical fibre is arranged to generate a rotation of the polarisation direction in a normal scattering regime.

3. The device according to claim 1, in which the pulse laser is a Q-switching laser.

4. The device according to claim 3, in which the pulse laser is arranged so as to operate with an emission wavelength between 800 nanometers and 1.2 micrometers.

5. The device according to claim 1, in which the pulse laser includes a non-polarised pulse laser and an input polariser.

6. The device according to claim 1, further including a half-wave plate positioned between the pulse laser and the bi-refringent optical fibre, and arranged so that the polarisation direction of the laser wave at the output of said half-wave plate is not co-linear with said bi-refringence axes.

7. The device according to one of the claims from 1, 2 or 3, 5, in which said pulse laser is arranged in relation to the bi refringent optical fibre so that said polarisation direction is not co-linear with said bi-refringence axes.

8. The device according to claim 1, in which said pulse laser is capable of emitting a laser pulse with an emission wavelength, and the bi-refringent optical fibre is a single-mode fibre transversal to said emission wavelength.

9. The device according to claim 1, in which the bi-refringent optical fibre has a scattering zero wavelength that is greater than the emission wavelength.

10. A method for generating short pulses including steps in which:
- a device comprising;
- a polarised pulse laser with a polarisation direction;
- a bi-refringent optical fibre with bi-refringence axes, in which the bi-refringent optical fibre is arranged to generate a rotation of the polarisation direction in a non-solitonic regime, said polarisation direction not being co-linear with said bi-refringence axes;
- an output polariser positioned at the output of said fibre, said polariser being capable of selecting a polarisation at the output of said fibre;
- in which said pulse laser is a longitudinally quasi-single mode laser;
- the polarised pulse laser generates long pulses;
- the long pulses are cut up in the bi-refringent optical fibre in order to generate the short pulses;
- the short pulses are recovered at the output of the output polariser.

11. The method for generating short pulses according to claim 10, in which the pulse duration of the short pulses is 10 to 16 times shorter than the pulse duration of the long pulses.

12. The method for generating short pulses according to one of claims 10 or 11, in which the bi-refringent optical fibre generates a rotation of the polarisation direction in a normal scattering regime, so as to generate short pulses from long pulses.

* * * * *

UNITED STATES PATENT AND TRADEMARK OFFICE
CERTIFICATE OF CORRECTION

PATENT NO. : 8,233,509 B2  
APPLICATION NO. : 12/515839  
DATED : July 31, 2012  
INVENTOR(S) : Paul-Henri Pioger et al.

Page 1 of 1

It is certified that error appears in the above-identified patent and that said Letters Patent is hereby corrected as shown below:

IN THE CLAIMS:

Please amend the claims as follows:

Column 6, line 60 in Claim 7, delete "from 1, 2 or 3, 5" and insert --from 1-5--

Signed and Sealed this
Twenty-third Day of April, 2013

Teresa Stanek Rea
*Acting Director of the United States Patent and Trademark Office*